United States Patent [19]

MacDonald

[11] Patent Number: 4,617,592
[45] Date of Patent: Oct. 14, 1986

[54] VIDEO RETOUCHING SYSTEM

[75] Inventor: Lindsay W. MacDonald, Irvine, Calif.

[73] Assignee: Crosfield Electronics Limited, London, England

[21] Appl. No.: 473,400

[22] Filed: Mar. 8, 1983

[30] Foreign Application Priority Data

Mar. 11, 1982 [GB] United Kingdom ............. 8207152

[51] Int. Cl.$^4$ ............................................. H04N 1/40
[52] U.S. Cl. ................................. 358/80; 358/78
[58] Field of Search ................ 358/80, 76, 78, 22, 358/183, 21 R

[56] References Cited

U.S. PATENT DOCUMENTS 4,204,223 5/1980 Gast et al. .................. 358/80
4,335,398 6/1982 Yamada .................... 358/80

FOREIGN PATENT DOCUMENTS

80/02607 11/1980 PCT Int'l Appl. .

Primary Examiner—Michael A. Masinick
Attorney, Agent, or Firm—Sughrue, Mion, Zinn, Macpeak, and Seas

[57] ABSTRACT

In a video retouching system having an image source (40), a refresh store (42) fed from the image source, and a monitor (46) supplied from the refresh store, an image modifier (44) is interposed between the refresh store and the monitor and is controlled by a modifying store having a multi-bit location for each picture element. The stored multi-bit values may be used, for example to modify the display to obtain a vignetting effect, or to lighten or darken picture elements or modify chrominance. Preferably a mask store (48) having one bit per pixel defines those pixels which may be modified and those which must not be modified. In one form, the store with a multi-bit location for each picture element controls the merging of two images.

5 Claims, 6 Drawing Figures

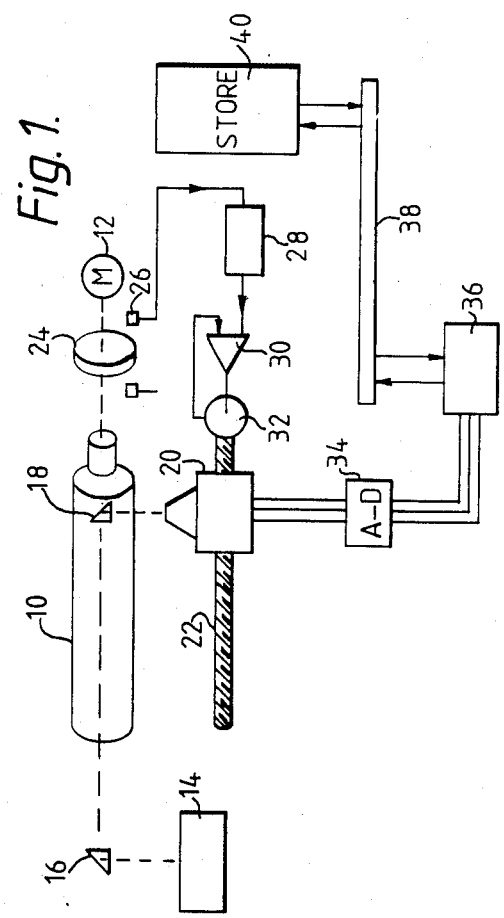
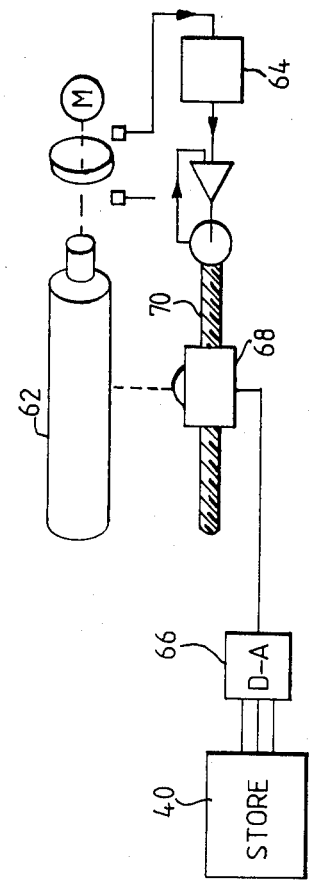

VIDEO RETOUCHING SYSTEM

This invention concerns video retouching systems (VRS).

In video retouching systems, signals from an image source (for example a scanner, facsimile receiver, or a disk pack on which is stored image data) are transferred into a refresh store, thence to a monitor on which the stored image is displayed. The video signals from the refresh store pass through an image-modifying means to which also connects a control input. The modifying means responds interactively according to signals at the control input dependent on the settings of operator controls.

More particularly, parameters from the control settings, and algorithms embodied in the image modifying means, effect a transformation on colour image data passing along the video path from the image refresh store to the display monitor. Image modifying facilities typically include tonal adjustment, black and white levels, colour balance and cast adjustments. Also possible is the colour replacement described in our co-pending U.S. patent application No. 397701, now U.S. Pat. No. 4,496,968.

According to the present invention, a video retouching system having an image store of pixel (picture-element) signals, a display monitor responsive to the signals in the image store, and a display modifying means under operator control, for altering signals applied to the display monitor, further comprises a modifying store for multi-bit signals, each such signal corresponding to a display screen pixel, the display modifying means being responsive to the multi-bit signals in the modifying store to alter corresponding pixels in the displayed image under the control of the operator. As an example, the modifying store may be loaded with values such that when used to modify the display a vignetting effect is obtained.

It is known in the prior art to have a mask store connecting to the display modifying means. In the mask store there are one-bit pixels over an area coterminous with the area of the image, and pixels of the mask lie in one-to-one correspondence with those of the image. Pixel values from the mask store will control the display-modifying means to render the one class of image pixels receptive to some subsequent change in operation, and the other class not receptive to change. The mask pixel values will be set up by the computer as a result of the operator viewing the monitor and moving a cursor to outline the area of interest in the image. Alternatively mask pixels may be set up by the computer from the classification of image pixels into two mutually exclusive classes.

In the preferred embodiment of the present invention, a mask store and the modifying store are used jointly to control the display.

The use of the mask in the video retouching system of the invention to act jointly with the modifying store greatly enhances the advantages provided by the invention. This is because the mask store can define an edge precisely where this is required and the store of multi-bit pixels in the video retouching system of the invention enables gradual changes and soft edges to be obtained in the area defined by the mask. As an example of the advantage of such a combination, if a modification is to be introduced into an area of the picture representing a shadow cast by an object in the picture, the edge of the object can be defined by the mask and the tone or colour gradation in the shadow area can be effected with the multi-bit values in the modifying store, which may overlap the "edge".

The inability to provide a soft edge, giving a natural appearance in retouch modification, has been a disadvantage in using mask stores. Also, when a mask store is used, an edge of the mask which is inclined to the raster direction has a stepped appearance. Although in computer graphics applications there are known techniques for improving the appearance of lines inclined to the raster lines of a display (generally involving calculating the crossing point at a higher resolution than the raster line spacing and then averaging or interpolating to produce intermediate density values), the change is generally effected over the distance of one pixel. These "anti-aliasing" techniques, as they are known, cannot accommodate the range of effects used for image retouching in the graphic arts.

Also, in the preferred embodiment of the invention the modifying store is loaded from a pattern generator which is under operator control.

Once the desired modification has been achieved, the modified pixel values can be entered into the main image store in place of the original values for those pixels. This main image store may be at high resolution, while the "refresh" store which supplies the display monitor and the modifying store are at coarse resolution. When the data which has been modified is entered into the high-resolution main store, it may be subjected to data processing (for example interpolation between adjacent low-resolution elements) to generate a high-resolution modifying pattern.

It is a disadvantage of many video retouching systems that changes have to be effected on the original data before they can be viewed, and once they have been effected the original cannot always be recovered. By modifying the main image store only when the modified display is considered satisfactory, we overcome this difficulty.

In order that the invention may be better understood, an example of a video retouching system embodying the invention will now be described with reference to the accompanying drawings, wherein:

FIG. 1 shows known apparatus for deriving colour signals for application to a monitor;

FIG. 6 shows conventional apparatus for producing colour separations from stored signals.

Figure 2:
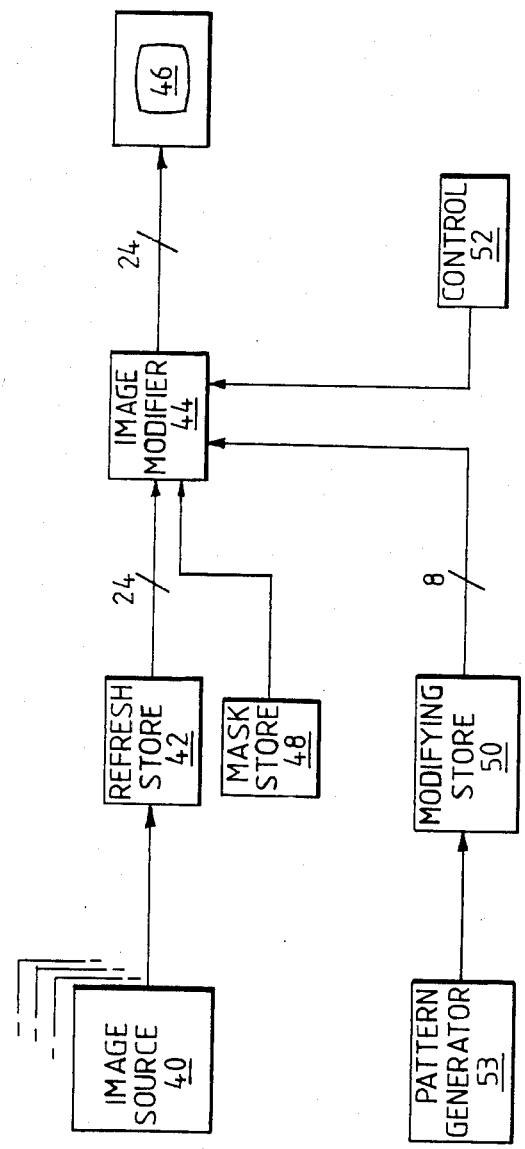
FIG. 2 shows a video retouching system in accordance with a first embodiment of the invention.

FIG. 1 shows an apparatus for deriving signals for application to the monitor. In FIG. 1 an original (not shown) is wrapped around a transparent drum 10 driven by a motor 12. Light from a lamp within the housing 14 is reflected by a prism 16 and a prism 18 (within the drum 10), the reflected light passing through the transparent original and to a photomultiplier in an analysing head 20. The head 20 is mounted on a lead screw 22 driven by a servo system under the control of a grating 24 and pick-up 26. The servo system comprises a control unit 28, a servo amplifier 30 and a servo motor 32.

Within the analysing head 20, the light falls on three photomultipliers after passing through three individual filters. As a consequence, three signals representing the red, blue and green components of the original are applied from the head through correcting circuits (not shown) to an analogue-to-digital converter 34. From the converter 34, the signals are applied through a controller 36 and a bus line 38 to a store 40.

Timing signals derived from the pick-up 26 are also applied to the controller 36 so that the controller can enter samples into store 40 at the required increments of drum rotation.

Turning now to FIG. 2, signals from the store 40, constituting the image source, are applied to a refresh store 42 and thence through an image modifying means 44 to a visual display monitor 46. A mask store 48 and a modifying store 50 are also connected to the image modifying means, together with operator controls 52.

The modifying store 50 is a store containing one multi-bit (in this case one byte) location for each pixel of the display on the monitor 46. Thus, it contains modifying information for the whole plane of the image and for this reason may be called a byte plane. In the example shown, a pattern generator 53 is shown connected to the modifying store 50 to permit the store to be loaded with a pattern of one-byte data elements.

The mask store may be used to identify a feature of the display which is not to be altered. The pattern generator can then be used to load the modifying store with data for altering the image outside the identified feature, for example to add shadows.

In the case of adding shadows, for example, the invention provides the advantage that the mask defines the sharp edge of the principal feature; consequently there is no need to define a sharp edge in the multi-bit modifying store 50. The shadows may be made darker or lighter, without affecting the original image. The darkening or lightening may in fact be carried out by changing the control input to the image modifying means, so that the stored shadow data in the modifying store 50 is also unchanged.

In another example, the pattern generator is used to draw in a figure superimposed on the image. Then the colour of the figure, as well as the location of the figure, can be changed without affecting the original image.

In this example, the modifying store or byte plane contains values which may be applied to any chosen coordinate, for example to an intensity signal to effect either lightening or darkening or to a chrominance signal.

The manner in which the data in the modifying store operates on the data in the image store, constituted by the refresh store, is determined by algorithms in the image modifying means 44. The combination could be a simple linear combination but exponential or trigonometric functions are envisaged.

In one example the following algorithm is used;

$$s' = s + (A/255) \cdot S \quad (1)$$

s' is the signal passed to the monitor;
s is the signal in the refresh store;
A is the value stored in the byte plane at a location corresponding to the image pixel; and S is an arbitrary coefficient chosen to effect the desired change.

The effect of this algorithm would be to add a transparent tint over the original image.

Figure 3:
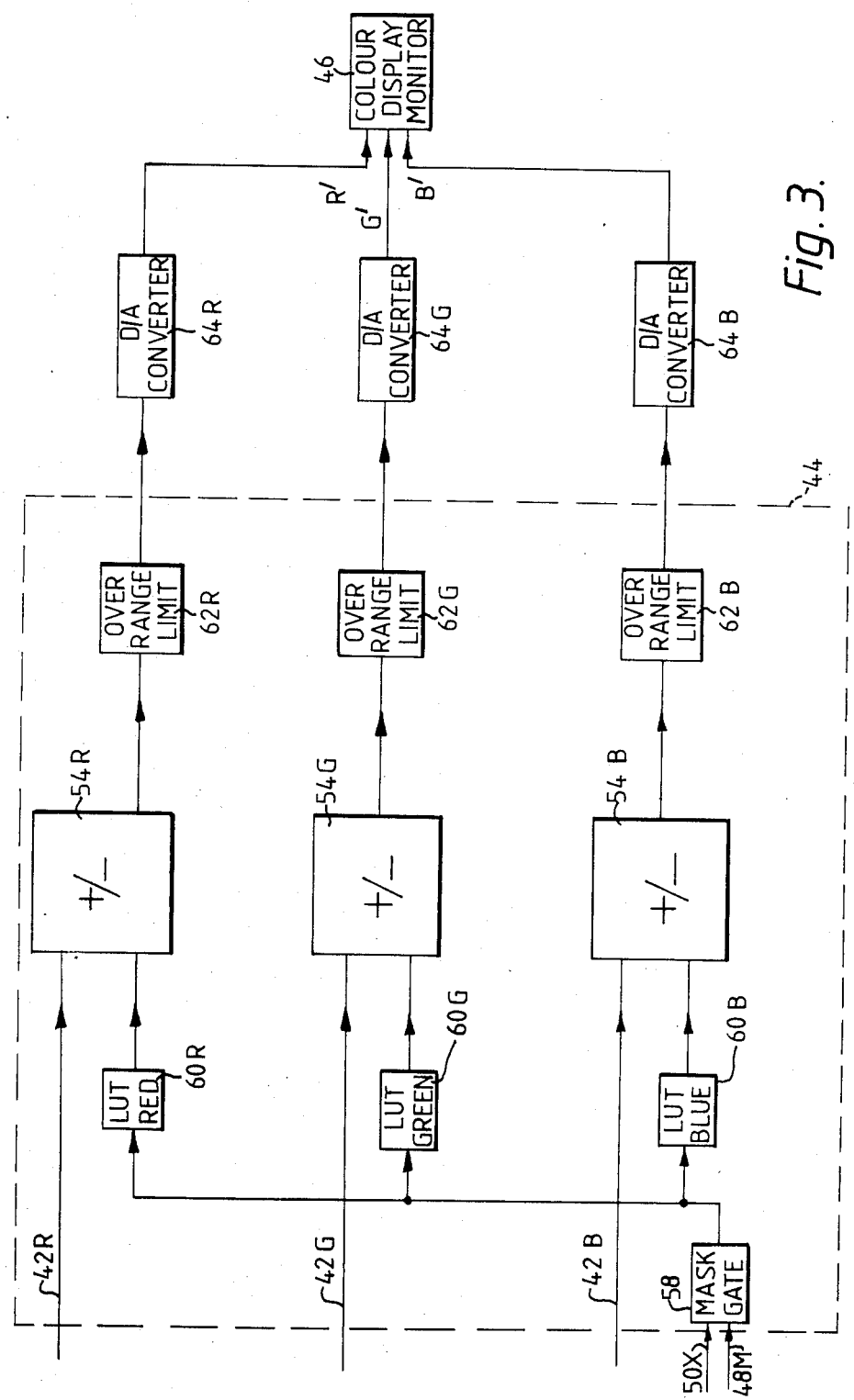
FIG. 3 is a block diagram of a signal processor suitable for use in the video retouching system of FIG. 2.

FIG. 3 is an expanded block diagram of image modifier 44 suitable for carrying out the above-mentioned algorithm (1) in the video retouching system of FIG. 2. In FIG. 3, signals from the refresh store 42 of FIG. 2 representing red, green and blue components of the image, each represented by a byte of information for each picture element, are fed along lines 42R, 42G and 42B to three arithmetic logic units 54R, 54G and 54B.

A mask gate 58 receives for each pixel a byte signal over connection 50X and a 1-bit signal from the mask store 48 over connection 48M. The mask gate 58 transmits or does not transmit the byte signal on line 50X, according to whether the signal on connection 48M is a one or a zero.

The byte signals passed by the gate 58 are applied to stores (look-up tables) 60R, 60G and 60B. These lookup tables are loaded to provide appropriate characteristics for the modification of the red, green and blue signals by the 1-byte density signals derived from the modifying store 50. The look-up tables 60R, 60G and 60B are loaded by the operator control means 52 of FIG. 2.

The outputs of the look-up tables 60R, 60G and 60B are respectively applied to the three-arithmetic logic units 54R, 54G and 54B. Each arithmetic logic unit is capable of adding the modifying data or subtracting the modifying data from the image store signals on lines 42. A byte of all zeros represents no excitation of a cathode ray tube electron gun and a byte of all ones represents maximum excitation. Hence, the use of the arithmetic logic units 54 in the adding mode lightens the picture and their use in the subtracting mode darkens the pictures.

The signals resulting from the addition or subtraction in arithmetic logic units 54 are applied to over-range limiting circuits 62R, 62G and 62B; such limiting is necessary to take into account additions or subtractions which would yield an out-of-range result.

The resulting modified colour signals are applied through digital-to-analogue converters 64R, 64G and 64B to provide the modified signals R', G' and B' for the colour display monitor 60.

If all three look-up tables 60 are loaded with the same density profile and all three arithmetic logic unit 54 are operating in the same mode (for example adding), the manipulations will be along the neutral colour axis. However, by loading the look-up tables 60 with different codes, a tinted result can be achieved.

Figure 4:
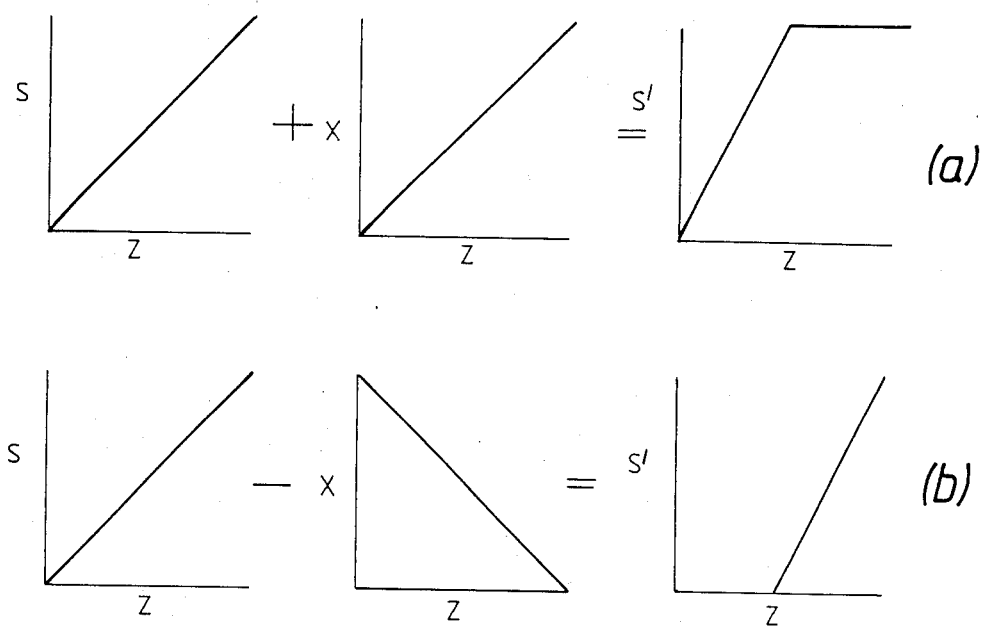
FIG. 4 shows addition and subtraction by the signal processor.

The effect of addition and subtraction with limiting is illustrated in FIGS. 4a and 4b, in which s represents the image source signal, x is the modifying signal(x-=(A/255)s in the example given), and s' is the resultant of the addition and limiting, z being an arbitrary variable.

A second algorithm which could be carried out with the apparatus of FIG. 2 but with a different image modifier 44, is:

$$s' = \left(1 - k \cdot \frac{A}{255}\right) s + k \frac{A}{255} \cdot S \quad (2)$$

The effect of using this second algorithm would be to build up a more opaque colour, the degree of opacity being determinable by choice of the value of k. If k is given the value of 1, there is total opacity.

In considering algorithms (1) and (2), s is an arbitrary chrominance or intensity parameter, depending upon the choice of colour coordinates. There are similar parallel algorithms for the one or more additional coordinates of the colour system in use.

Figure 5:
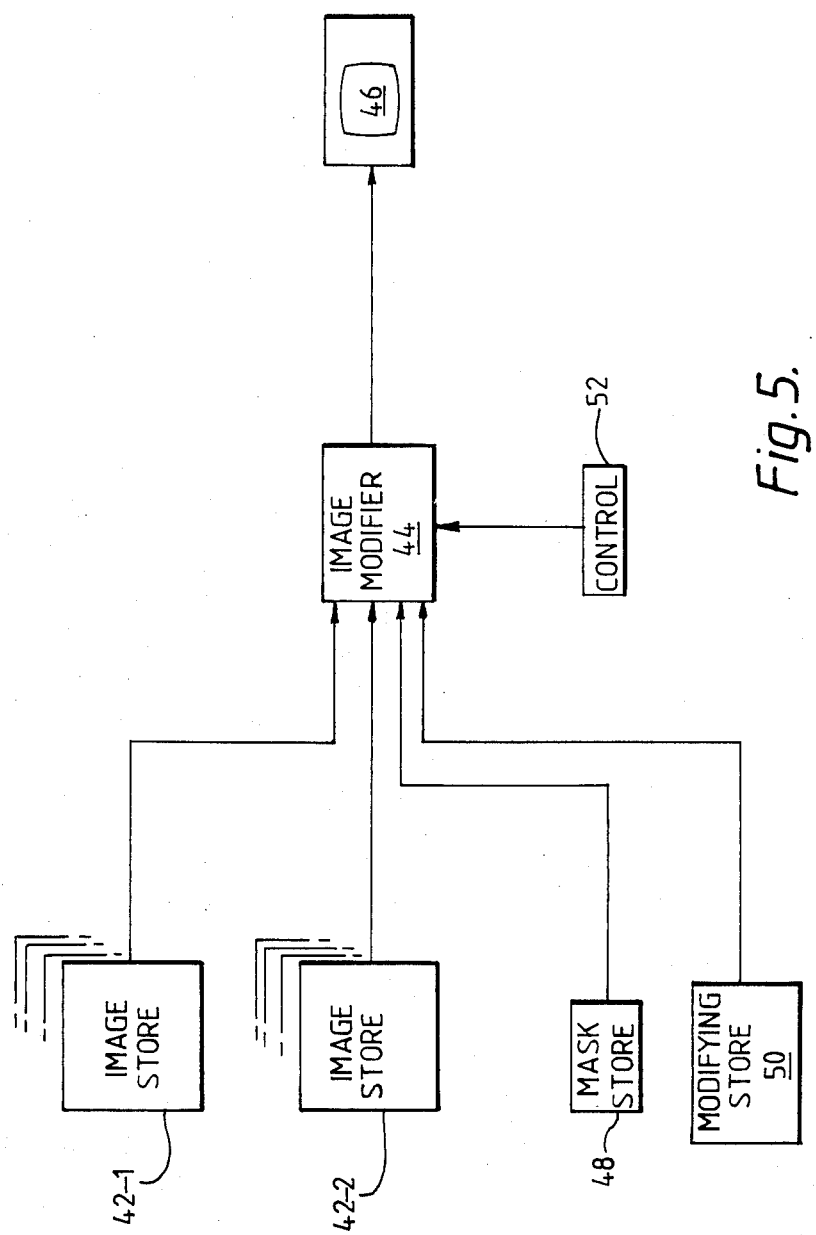
FIG. 5 shows a more complex embodiment of the invention.

FIG. 5 shows yet a further embodiment of the invention. In the example of FIG. 5, there are two image stores 42-1 and 42-2, each of which is connected to supply signals for the image modifier 44. The image modifier 44 also receives signals, as in FIG. 2, from a mask store 48 and a modifying store 50. Also as in the case of FIG. 2, its operation is controlled by an operator control unit 52.

Algorithms at the image modifying means 44 determine how pixels from the two image stores 42-1 and 42-2 are combined, weighting values for the algorithms being derived from the store 50. If s and S are considered to be the signals in the image (refresh) stores 42-1 and 42-2 the second algorithm, given above by equation (2), would have the effect of blending or superimposing the two image signals S and s to produce a composite output s'. In this case the stored image data is not modified for either image. The effect of the combination will be seen on the monitor, and is under the interactive control of the operator through unit 52.

The modifying store is not restricted to one byte per pixel, as described hitherto. It might equally store multi-bit values of more or less than 8 bits of information per pixel, as appropriate for the application.

Once the display image is satisfactory, the stored pixel values in the store 40 are modified in a manner identical to that carried out by image modifier 44. This may be done by a digital computer which is supplied with data representing the contents of the modifying store 50 and the control instructions supplied to the image modifier 44 by the operator control unit 52 and programmed to execute the same algorithm as that implemented by the image modifier 44.

Finally, the new contents of the store 40 are used to form an image reproduction or colour separation in the manner shown in FIG. 6.

In FIG. 6, the materials which are to form the colour separations are wrapped around a drum 62; the exposures take place one at a time in the example described. Under the control of timing signals derived from a controller 64, signals from the store 40 are applied through a digital-to-analogue converter 66 and the resulting analogue signals for each colour in turn are used to modulate a light source in an exposing head 68, on the assumption that the separation is being formed by means of a light-sensitive paper. The head 68 is mounted on a lead screw 70 which is driven in the same manner as the lead screw 22 in FIG. 1.

It will be clear that while in most cases the image source 40 will be a store, there may be some cases in which it is, for example, a facsimile receiver; in the latter case the refresh store 42 constitutes the only image store.

I claim:

1. A video image modifying system comprising:
   a first store for signals representing image pixel values;
   a second store for signals for the same image pixels;
   a display monitor responsive to pixel signals and providing a corresponding display;
   a modifying store for multi-bit pixel values, each such pixel value corresponding to an image pixel;
   display modifying means for receiving signals from the modifying store and for receiving and combining pixel signals from the first and second stores and applying the resultant pixel signals to the display monitor; and
   control means having an output connected to the display modifying means and establishing a combining function determining the response of the display-modifying means to the values from the modifying store;
   wherein the display modifying means, operates to provide display control pixel signals which result from functionally combining the corresponding pixel values from the first and second stores under the control of the modifying value from the modifying store and the combining function established by the control means.

2. A video image modifying system comprising:
   an image store for image pixel signals;
   a display monitor for receiving pixel signals and providing a corresponding display;
   a modifying store for multi-bit signals, each such signal corresponding to a display screen pixel;
   display modifying means for receiving signals from the image store and from the modifying store and modifying the image pixel signals before their application to the display monitor; and
   control means for controlling the response of the display-modifying means to the signals from the modifying store;
   wherein the display modifying means, which receives the image pixel signals, operates in accordance with the algorithm $$s' = (1 - k \cdot A/n) \cdot s + k \cdot (A/n) \cdot S$$

in which:
   s' is the signal passed to the monitor;
   s is the signal in the refresh store;
   A is the value stored in the modifying store at a location corresponding to the image pixel;
   n is a factor serving to ensure that $0 < A/n < 1$
   S is an arbitrary coefficient chosen to effect the desired change or is the signal in a second refresh store; and
   k is a coefficient controlling the effect of the modifying data.

3. A video image modifying system in accordance with claim 2, further comprising a mask store connected to the display-modifying means and consisting of a store of one-bit pixels over an area coterminous with the area of the image, the one-bit pixel values from the mask store rendering one class of image pixels receptive to change in the display modifying means and rendering the other class not receptive to change.

4. A video image modifying system in accordance with claim 2, in which the display modifying means comprises a separate look-up table for each display monitor colour signal and a separate signal-combining circuit for each display monitor colour signal, each look-up table having its input connected to receive signals from the modifying store and each signal-combining circuit having its input connected to receive signals from the corresponding look-up table and signals from the image store, the output signals from the signal-combining circuits being used to control the colour monitor display.

5. A video image modifying system in accordance with claim 2, comprising a second image store, also connected to supply signals to the display modifying means, and in which the display modifying means operates to merge the image signals from the two image stores under the control of the signals in the modifying store.

* * * * *